United States Patent
Davies

(10) Patent No.: US 6,167,694 B1
(45) Date of Patent: Jan. 2, 2001

(54) ACTUATOR

(75) Inventor: Stephen Harlow Davies, Telford (GB)

(73) Assignee: Lucas Industries Limited (GB)

( * ) Notice: Under 35 U.S.C. 154(b), the term of this patent shall be extended for 0 days.

(21) Appl. No.: 09/447,106

(22) Filed: Nov. 22, 1999

(30) Foreign Application Priority Data

Nov. 23, 1998 (GB) .................................................. 9825651

(51) Int. Cl.$^7$ .............................. F02K 3/02; F16H 27/02; F16H 1/18
(52) U.S. Cl. .................................... 60/226.2; 74/424.8 B; 74/89.15
(58) Field of Search ................................ 60/226.2, 230; 74/424.8 B, 89.15

(56) References Cited

U.S. PATENT DOCUMENTS

| | | |
|---|---|---|
| 2,092,563 | 9/1937 | Tucker . |
| 2,674,438 | 4/1954 | Dalton . |
| 2,819,589 | 1/1958 | Geyer . |
| 3,203,269 | 8/1965 | Perrine . |
| 4,216,909 | 8/1980 | Carlin . |
| 4,519,561 | 5/1985 | Timms . |
| 4,953,419 | 9/1990 | Schlenker . |
| 5,303,604 | * 4/1994 | Mayfield .............................. 74/89.15 |
| 5,848,554 | 12/1998 | Kober et al. . |

FOREIGN PATENT DOCUMENTS 0 552 129    7/1993   (EP) .

* cited by examiner

Primary Examiner—Timothy S. Thorpe
Assistant Examiner—Ehud Gartenberg
(74) Attorney, Agent, or Firm—Andrus, Sceales, Starke & Sawall

(57) ABSTRACT

An actuator comprising a drive arrangement arranged to rotate a first drive member, the first member being in screw-threaded engagement with a second member, the second member being in screw-threaded engagement with a third, output member, wherein the screw-threaded engagement between the first and second members is such that, when the first member rotates at a given speed relative to the second member, the second member moves axially relative to the first member at a first speed, the screw-threaded engagement between the second and third members being such that, when the second member rotates at the said given speed relative to the third member, the third member moves axially relative to the second member at a second, higher speed. The invention also resides in an aircraft engine thrust reverser system utilizing one or more of the above actuators for deploying cowls of the system.

5 Claims, 1 Drawing Sheet

Figure 1:
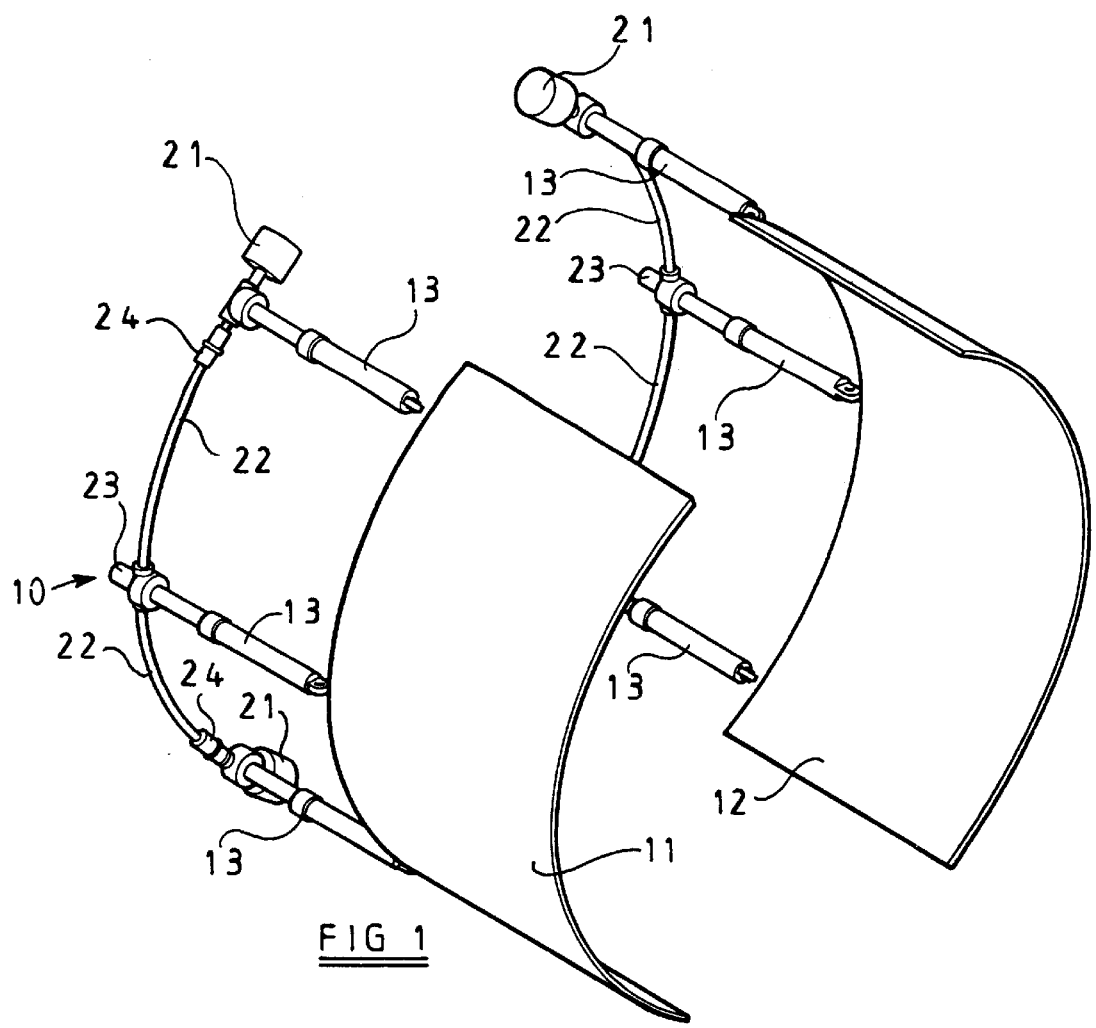

U.S. Patent  Jan. 2, 2001  US 6,167,694 B1

ACTUATOR

This invention relates to an actuator, and in particular to an actuator arranged to be driven by an electric motor. The invention is particularly suitable for use in aerospace applications, for example in driving the cowls of a thrust reverser system between their stowed and deployed conditions. It will be appreciated, that the invention is also applicable to other applications for example driving aircraft flaps or moving hatch doors, and may be used in non-aerospace applications.

A typical thrust reverser actuator is hydraulically driven between stowed and actuated positions. In order to move a thrust reverser cowl of a thrust reverser system, an initial high force must be applied by the actuator. After the initial movement of the cowl, the applied force can be reduced. However, typically, the applied force is not significantly reduced, the force applied by the actuator remaining at substantially its initial high level throughout the movement of the associated cowl. Clearly, this results in the system being relatively inefficient.

It is an object of the invention to provide an electrically driven actuator which obviates or mitigates this disadvantage.

According to the present invention there is provided an electrically driven actuator comprising a drive arrangement arranged to rotate a first, drive member, the first member being in screw-threaded engagement with a second member, the second member being in screw-threaded engagement with a third, output member, wherein the screw-threaded engagement between the first and second members is such that, when the first member rotates at a given speed relative to the second member, the second member moves axially relative to the first member at a first speed, the screw-threaded engagement between the second and third members being such that, when the second member rotates at the said given speed relative to the third member, the third member moves axially relative to the second member at a second, higher speed.

Where such an actuator is used to drive a cowl forming part of a thrust reverser system from a stowed position to a deployed position, the initial load applied to the third member by the cowl is high and substantially prevents rotational movement of the second and third members. As the second and third members do not rotate, rotation of the first member by the drive arrangement causes the second member to move axially at a low rate, thus commencing movement of the cowl. As the cowl moves, a point will be reached beyond which the load on the third member falls to a sufficiently low rate that relative movement between the second and third members can occur. Once this point is reached, the second member commences rotary movement with the first member, thus movement of the third member and the cowl occurs relative to the first and second members at a higher rate.

The second member conveniently comprises a dual rate nut, the first and third members comprising first and second screw-threaded rods, the first rod and corresponding part of the dual rate nut being provided with fine pitch screw threads, the second rod and corresponding part of the dual rate nut being provided with coarser pitch screw threads.

Preferably the screw threaded mechanisms are ball-screw mechanisms.

Desirably the relative axial movement of the first and second members is limited by abutment means whereafter in use continued rotation of the first member rotates the second member relative to the third member.

The invention further relates to an actuator system comprising a plurality of actuators of the type described hereinbefore, wherein the drive arrangements of the actuators are interconnected such that the actuators can be driven by a common electric motor. The invention still further resides in a thrust reverser system utilizing actuators or an actuator system as defined above for deploying cowls of the system.

Figure 2:
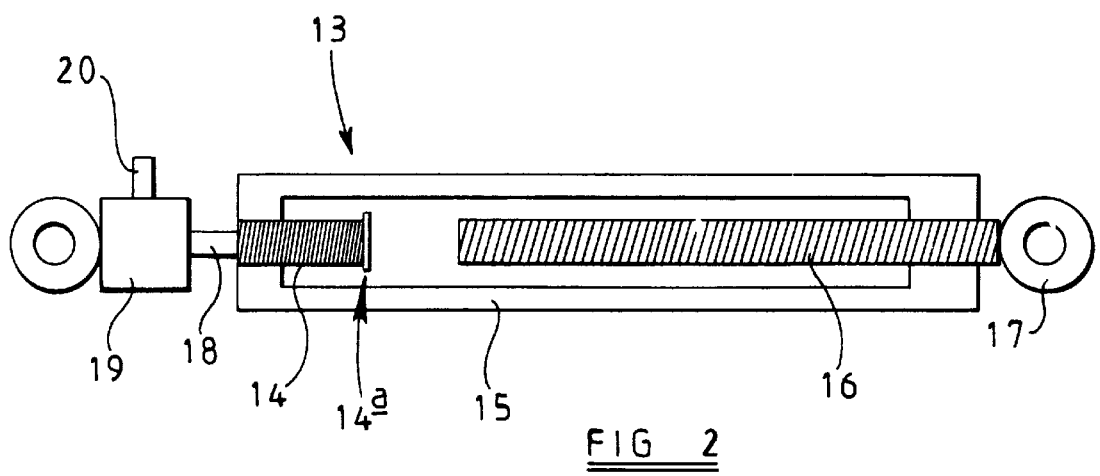

The invention will further be described, by way of example, with reference to the accompanying drawings, in which:

FIG. 1 is a diagrammatic perspective view of a thrust reverser actuator system and parts of a thrust reverser system; and FIG. 2 is a diagrammatic view of an actuator in accordance with an embodiment of the invention, the actuator forming part of the actuator system shown in FIG. 1.

FIG. 1 illustrates an actuator system 10 for use in controlling the operation of a thrust reverser system. The thrust reverser system includes cowls 11, 12 each of which is moveable between a stowed, inoperative position and a deployed, operative position. In use, when the thrust reverser system is inoperative, the cowls 11, 12 are locked in their stowed positions. When the thrust reverser system is to be operated in order to redirect the engine thrust in order to apply a braking action to an aircraft, after landing, the cowls 11, 12 are moved to their deployed positions. The cowls 11, 12 are moveable by means of actuators 13 forming part of the system 10. As illustrated, each cowl 11, 12 has three actuators 13 associated therewith. It will be appreciated, however, that the invention is also applicable to arrangements in which the cowls have fewer or a greater number of actuators associated therewith.

As illustrated simplistically in FIG. 2, each actuator 13 comprises a first member 14 in the form of a screw-threaded rod, the first member 14 being in screw-threaded engagement with a second member 15 in the form of a dual rate nut. The second member 15 also engages a third member 16 which comprises another screw-threaded rod. The third member 16 is secured to a mounting eye 17 for non-rotatable connection to an appropriate extension or formation forming part of the associated one of the cowls 11, 12. In practice it is probable that screw mechanism 14, 15 and the screw mechanism 15, 16 will be ball-screw mechanisms.

The first member 14 is secured to the output shaft 18 of a drive arrangement 19. The drive arrangement 19 comprises a gearbox which is driven by an input shaft 20 which, in use, may be connected to the output of an appropriate electrical motor 21. Alternatively, the input shaft 20 may be connected to a synchronizing member 22 which is driven at the same speed as the motor 21 by the drive arrangement 19 of another of the actuators 13.

In the arrangement illustrated in FIG. 1, each of the cowls is arranged to be driven between its stowed position and its deployed position by three actuators 13. Two electric motors 21 are provided to drive each cowl. It will therefore be appreciated that the drive arrangements 19 of two of the actuators 13 associated with each cowl will be driven directly by the electric motors 21, and that the third actuator 13 is driven through the synchronizing members 22. In addition to supplying drive to the third actuator 13, the synchronizing members 22 act to ensure that the drive arrangements 19 of all of the actuators 13 are driven at substantially the same speed.

A position sensor 23 is associated with the drive arrangement 19 of one of the actuators 13 associated with each cowl to provide an indication as to the position of the cowl. The synchronizing members 22 are each provided with a lock 24 which may, if desired, be released in order to permit one of the actuators 13 to be moved independently of the other actuators 13 associated with one of the cowls, for example, for maintenance purposes.

As illustrated somewhat diagrammatically in FIG. 2, the first member 14 is provided with a helical screw thread which is of relatively fine pitch. The part of the second member 15 which engages the screw thread of the first member 14 is provided with a corresponding helical screw thread. The third member 16 is provided with a helical screw thread which is of relatively coarse pitch, and the part of the second member 15 which cooperates with the screw thread of the third member 16 has a corresponding thread.

FIG. 2 illustrates the actuator 13 in its stowed condition. When it is desired to move the thrust reverser to its operative position, any locks associated with the thrust reverser are released, and the motors 21 are driven, driving the drive arrangements 19 to cause rotation of each first member 14. It has been found that when the thrust reverser is in its stowed position, a load of large magnitude is applied to the actuators 13 by the cowls, tending to hold the thrust reverser in its stowed condition. The application of this load is transmitted through the screw-threaded engagement between the first, second and third members 14, 15, 16. As a result of the application of this large load, and as a result of the provision of the relatively coarse screw-threaded engagement between the second and third members 15, 16, relative movement between these members does not occur. It will therefore be appreciated that upon rotating the first member 14, relative rotation occurs between the first and second members 14, 15, and axial movement of the second member 15 relative to the first member 14 occurs. The speed of axial movement is relatively low due to the provision of the fine pitch of the screw-threaded engagement between the first and second members 14, 15. Also, as a result of the fine pitch of the screw-threaded engagement, the mechanism 14, 15 has a relatively high mechanical advantage and so the actuator can apply a relatively large magnitude force to the associated cowl of the thrust reverser.

As the cowl of the thrust reverser moves from its stowed position, the magnitude of the force applied by the cowl to the actuator 13 reduces, and a point will be reached beyond which the magnitude of the load falls to a sufficiently low level that relative rotation can occur between the second and third members 15, 16. The axial length of the first member 14 is chosen such that the relative movement between the second and third members 15, 16 commences as the second member 15 reaches an end stop 14a of the first member 14. Thus even if the fall in load is insufficient to promote relative rotation of the second and third members 15, 16, such relative rotation will occur with continued rotation of the member 14 as engagement of the member 15 with the stop 14a prevents further relative rotation of the members 14,15. The continued rotation of the first member 14 causes the second member 15 to rotate with the first member 14, and as the third member 16 is held against rotation by the cooperation between the eye 17 and the associated cowl, relative rotation occurs between the second and third members 15, 16. Such relative rotation causes the third member 16 to move axially relative to the second member 15, and this axial movement occurs at a relatively high speed due to the relatively coarse screw-threaded engagement between these components. Also as a result of the relatively coarse pitch of the engagement between the components 15, 16 the mechanism has a relatively low mechanical advantage and so the actuator 13 applies a correspondingly lower magnitude force to the cowl.

Rotation of the first member 14 continues until the cowl associated with the actuator 13 has reached its deployed position. The motors 21 are then switched off and the cowls 11, 12 are held in their deployed positions. The member 16 may have a stop similar to the stop 14a of the member 14 at its innermost end to limit relative extending movement of the member 16 relative to the member 15.

When the thrust reverser is to be returned to its inoperative, stowed condition, the motors 21 are rotated in the reverse direction first causing relative rotation of the first and second members 14, 15 and thus moving the second and third members axially relative to the first member 14, until the second member abuts a stop (not shown) on the first member 14 similar to the stop 14a but positioned at the opposite end of the member 14 from the stop 14a. Thereafter continued rotation of the motors 21 causes relative rotation of the second and third members 15, 16, so that the third member 16 moves axially relative to the first and second member 14, 15 until the actuators 13 occupy the position illustrated in FIG. 2 in which the cowls are stowed, at which point the motors 21 are de-energised. As a precautionary measure further relative rotation of the second and third members 15, 16 may be prevented by a conveniently positioned stop (not shown) on the member 16, or by the eye 17, abutting the member 15.

Although the actuator is described hereinbefore with reference to the operation of an aircraft thrust reverse system, it will be appreciated that the actuator is suitable for use in other applications, for example in moving the flaps of an aircraft or for moving an aircraft hatch between open and closed positions. It will also be appreciated that the actuator may have non-aerospace applications.

I claim:

1. An aircraft engine thrust reverser utilizing one or more actuators for deploying cowls of a thrust reverser system, the actuator comprising a drive arrangement arranged to rotate a first drive member, the first member being in screw-threaded engagement with a second member, the second member being in screw-threaded engagement with a third, output member, wherein the screw-threaded engagement between the first and second members is such that, when the first member rotates at a given speed relative to the second member, the second member moves axially relative to the first member at a first speed, the screw-threaded engagement between the second and third members being such that, when the second member rotates at the said given speed relative to the third member, the third member moves axially relative to the second member at a second, higher speed; wherein said second member comprises a dual rate nut, the first and third members comprising first and second screw-threaded rods, the first rod and its corresponding part of the dual rate nut being provided with fine pitch screw threads, the second rod and its corresponding part of the dual rate nut being provided with coarser pitch threads.

2. An actuator as claimed in claim 1, wherein two screw threaded mechanisms are ball-screw mechanisms.

3. An actuator as claimed in claim 1, wherein the relative axial movement of the first and second members is limited by abutment means whereafter in use continued rotation of the first member rotates the second member relative to the third member.

4. An actuator system comprising a plurality of actuators as claimed in claim 1, wherein the drive arrangements of the actuators are interconnected such that the actuators can be driven by a common motor.

5. An aircraft engine thrust reverser system utilizing an actuator system as claimed in claim 4 for deploying cowls of the thrust reverser system.

* * * * *